United States Patent Office 3,330,737
Patented July 11, 1967

3,330,737
PROCESS FOR PREPARING CAROTENOIDS
AND AMINOSYDIN
Maria Pia Marnati, Agustin Prieto, and Celestino Spalla, Milan, Italy, assignors to Società Farmaceutici Italia, Milan, Italy, a corporation of Italy
No Drawing. Filed Mar. 9, 1964, Ser. No. 350,593
Claims priority, application Italy, Mar. 11, 1963,
4,965/63
9 Claims. (Cl. 195—28)

Our invention relates to a microbiological process for the preparation of carotenoids and aminosydin and to animal feedstuffs containing carotenoids so prepared in the form of the carotenoid-bearing mycelium of a new mutant of the strain Streptomyces chrestomyceticus, which we have designated Streptomyces chrestomyceticus var. aurantioideus.

Aminosydin is disclosed in Arcamone et al. Patent No. 3,065,147. Carotenoids, which comprise carotenes and xanthophylls, have a strong pigmenting power, promote body weight increase and show vitamin A-like activity.

Our invention has as an object a process for preparing carotenoids and aminosydin in which the microorganism Streptomyces chrestomyceticus var. aurantioideus is fermented in submerged culture and under aerobic conditions in an aqueous nutritive medium containing a source of carbon, nitrogen and mineral salts, and the mycelium containing carotenoids is separated from the fermentation broth containing aminosydin, by filtration and centrifuging. The process of the invention produces not only carotenoids but also aminosydin in a comparatively high yield without requiring special conditions, such as light irradiation.

The new microorganism, Streptomyces chrestomyceticus var. aurantioideus, may be obtained by a mutagenic treatment of the strain Streptomyces chrestomyceticus (Patent No. 3,065,147 and G. Canevazzi et al., Giornale di Microbiologia 1959, 7, p. 242–250) with a phosphate buffer solution of N-nitroso-N-methyl-urethane (G. Zetterberg, Exp. Cell Res. 1960, 20, p. 659) as a mutagenic agent. From the mycelium obtained by this treatment, the surviving microorganisms are isolated on a suitable medium by known technique and the strains capable of producing carotenoids and aminosydin are selected.

Streptomyces chrestomyceticus var. aurantioideus is designated strain 1131 of the Farmatalia collection; it has been deposited with Dr. Baldacci at the Institute of Plant Pathology of the University of Milan under the number 722 I.P.V. It has the following morphological, microscopic, macroscopic and biochemical properties.

*Microscopic aspect.*—On the usual cultural media, the vegetable mycelium shows thin (0.5–1$\mu$ thick), more or less long, branched hyphae. The hyphae are generally straight, sometimes bent into a hook form. The conidia are either cylindrical or oval and 0.3–0.4$\mu$ by 0.6–0.8$\mu$ in size.

*Macroscopic aspect.*—Table 1 lists the cultural properties observed on the media indicated therein, in which the microorganism is grown at 28° C.; observations were made on the 3rd, 8th, 15th, 21st and 30th day after inoculation.

*Biochemical properties.*—The strain hydrolizes gelatin as well as starch. Nitrates are not reduced. Hydrogen sulphide is not produced. Acids are produced using the following carbohydrates; trehalose, d-levulose, d-sorbitol, d-mannose, galactose, lactose, adonitol, d-mannitol, maltose, glycerol, dextrose, dextrine, starch. There is no acid production from ramnose, 1-arabinose, d-xylose, or saccharose. Tyrosine is destroyed. Milk is peptonized without coagulation. Aminosydin and carotenoids are produced in submerged liquid culture.

TABLE 1

| Media | Growth | Aerial Mycelium | Vegetative Mycelium | Soluble Pigments |
|---|---|---|---|---|
| Agar potato glucose.[2] | Thin folded patina. | Scanty, white yellowish. | Orange-yellow. | Absent. |
| Bennett Agar [1] | Granular patina with folds on the bottom. | Absent. | Dark orange. | |
| Emerson Agar [1] | Abundant lichen-like patina. | ----do---- | Dark orange-yellowish. | |
| Czapek Agar [1] | Veil. | ----do---- | Yellow. | |
| Asparagine Agar [1] | Abundant patina. | Scanty, whitish. | Yellow-orangy. | |
| Agar glycerol glycine.[1] | Abundant with thick folds. | ----do---- | Brown-orangy. | |
| Starch and salts Pridham Agar.[3] | Thin, granulated patina. | ----do---- | Intense orange. | |
| Oats Agar [2] | Granulated smooth opaque patina. | Scanty, white-yellowish. | Dark orange. | |
| Glycerol asparagine Agar.[1] | Patina. | ----do---- | Intense orange. | |

[1] Prepared according to Waksman "The Actinomycetes," Vol. II, 1961, pages 328–333.
[2] Prepared according to Baldacci et al "Journal of Microbiology," 1961, Vol. 9, page 39.
[3] Prepared according to Pridham et al "Antibiotics Annual," 1956–1957, pages 947–953.

*Identification of the strain.*—The strain 1131 differs from Streptomyces chrestomyceticus in that its does not reduce nitrates, peptonizes milk, has much scarcer aerial mycelium and an intensely yellow-orange pigmented vegetative mycelium, and produces carotenoids. Both in its origin and in its properties it is not very different from Streptomyces chrestomyceticus. We therefore conclude that the microorganism is a variety of S. chrestomyceticus and have accordingly designated it as S. chrestomyceticus var. aurantioideus.

S. chrestomyceticus var. aurantioideus differs from other microorganisms and particularly from those following which have some common properties. The strain 1131 differs from Streptomyces rimosus forma paramomycinus (Belgian Patent No. 547,976) in that it does not form spirals and because the color of its vegetative mycelium is intense orange as compared to the latter's colorless to light yellow. Streptomyces catenulae (U.S. Patent No. 2,895,876) has a vegetative mycelium having a more or less intense brown color with greenish rims, and a gray aerial mycelium and a pigment soluble in the substrate. Streptomyces pulveraceus (French Patent No. 1,294,121) forms spirals, has larger spores than strain 1131 and gray aerial mycelium.

According to the invention Streptomyces chrestomyceticus is preferably grown in a liquid medium, previously sterilized and in submerged culture, at a temperature of from 24° to 32° C., preferably at 28° C., from 1 to 8 days, preferably for 6 days, at a pH of from 5 to 8. The carbon source may for example consist of starch, dextrin, glucose, lactose, sorbitol, distiller's solubles, maltose, mannitol, glycerin, corn steep liquor, soyabean oil or cottonseed oil. The nitrogen source, besides the above-mentioned complex substances containing nitrogen, may for example be dry yeast, meat peptone, casein, casein hydrolysates, soya meal, malt, lysine, leucine, tryptophane, asparagine, alanine, or glutamic acid. Good results may also be achieved by using ammonium salts, such as ammonium nitrate, sulphate or phosphate. The mineral salts may for example be sodium or potassium phosphates, iron, zinc, magnesium or copper sulphates, calcium carbonate or other salts usually employed for this purpose. The fermentation may be carried out in laboratory flask or in laboratory fermenters or in industrial fermenters of various capacity.

During and at the end of the fermentation, aminosydin appears in the fermentation broth, the carotenoids in the mycelium. By varying the composition of the medium, the yield may be controlled in favor either of the aminosydin or of the carotenoids. Carotenoid production is stimulated by employing glucose, dextrin, lactose or mannitol as a carbon source, while the presence of starch stimulates aminosydin production. Good yields of both aminosydin and carotenoids may be achieved by using soyabean oil or cottonseed oil as a carbon source. Generally, strong aeration promotes the production of carotenoids and restrains the production of aminosydin, while slight or comparatively less intensive aeration promotes the production of aminosydin and restrains the production of carotenoids. Higher production either of aminosydin or of carotenoids, or good yields of both depend therefore on the choice of a suitable medium and conditions. High production of both aminosydin and carotenoids may be achieved by employment of a suitable medium containing soyabean or cottonseed oil and by carrying out the production of the two substances at different times. In a first, fermentative process, the strain 1131 is cultivated on a starch medium under conditions favorable to aminosydin production. After 4 to 6 days of fermentation, the mycelium is separated from the liquid phase containing the aminosydin. The mycelium is suspended in a solution containing glucose or one of the other substances mentioned above as promoting the formation of carotenoids, and fermentation is performed under conditions of strong aeration, to give a high production of carotenoids.

The extraction of aminosydin from the fermentation broth, being previously separated from the mycelium, is carried out as described in Arcamone et al. Patent 3,065,-147, by absorption on ion exchange resins followed by optional elution with solvents, or with acids, if the corresponding salts are desired. The carotenoids contained in the mycelium may be isolated by extraction with an organic solvent, for example, chloroform, acetone or methylene dichloride. The separation of the carotenes from the xanthophylls may be achieved by chromatography in separation over absorbent substances, such as magnesium oxide, siliceous earth, alumina and analogues.

The animal feedstuffs of the invention promote the growth of animals treated and, when administered to poultry, possess a remarkable pigmenting power. Good results have been obtained with chickens, turkeys, ducks, swine and cows. For the preparation of the feed, it is preferred to use the mycelium containing carotenoids directly. For this purpose, the mycelium formed during the fermentation is separated from the culture broth, preferably by filtration or centrifuging, and further by drying with warm air or in vacuo. On the average, 20–60 g. of dry residue per liter of culture broth are obtained. The dry residue contains from 0.2% to 1% of carotenoids, of which from 10% to 60% consists of carotenes and from 40% to 90% of xanthophylls. The dry mycelium is then ground in a mill or other means suitable for this purpose, and the powder obtained is thoroughly mixed with a composition as usually used in feeding animals. Such compositions normally comprise carbohydrates, proteins, vitamins and mineral salts. Examples of such substances are wheat and other cereals; residues of meat and fish as a source of animal proteins; soyabean as a source of vegetable proteins; vitamin complexes containing mainly vitamin D, vitamin PP and vitamin $B_{12}$; calcium carbonates, phosphates and bonemeal as mineral salts. To obtain a uniform dispersion of the mycelium in the feed, the powdered mycelium is preferably thoroughly mixed with an ingredient of the feed, preferably one of the feed ingredients usually employed, such as calcium carbonate and bonemeal. Any mixer may be employed for such purpose. The mixture obtained is then added to the other feed ingredients. If a product containing higher quantity of carotenoids to be added to the feed is desired, the mycelium may be extracted with organic solvents and the oily product obtained by previous evaporation of the solvent may be used as a feed supplement.

The following examples are to illustrate but not to limit the invention. The following are illustrative of suitable cation exchange resins for use in Example 1: Amberlite IRC50, Dowex 50, Kastel C 100, and Kastel C 300.

*Example 1*

*Streptomyces chrestomyceticus* var. *aurantioideus* was obtained as follows:

A suspension of mycelium of *Streptomyces chrestomyceticus* in a high degree of fragmentation was centrifuged. To the mycelium thus obtained, a solution of a mutagenic agent was added, prepared by dissolving 13 mg. of N-nitroso-N-methyl-urethane in 100 cc. of M/15 phosphate buffer, adjusted to pH 7.2. The resulting mixture was kept for 30 minutes at 24° C. The mycelium was then separated from the solution by centrifuging. The surviving microorganisms were isolated on plates of a medium having the following composition:

| | G. |
|---|---|
| Enzymatic casein hydrolysate | 10 |
| Glucose | 10 |
| Meat extract | 3 |
| Sodium chloride | 5 |
| Agar | 20 |
| Tap water | 1000 | pH (not adjusted).

The surviving colonies were examined as to their capacity of producing aminosydin and carotenoids. Among them, one colony characterized by the capacity of producing a high quantity of carotenoids and aminosydin was selected and designated by the number 1131.

A culture of the strain 1131 aged 8 days was employed to inoculate a 300-cc. Erlenmeyer flask containing 60 cc. of the following vegetative medium:

| | | |
|---|---|---|
| Dextrin | g | 30 |
| Casein | g | 5 |
| Calcium carbonate, $CaCO_3$ | g | 4 |
| Corn steep liquor | g | 3 |
| Ammonium sulphate, $(NH_4)_2SO_4$ | g | 1 |
| Potassium hydrogen phosphate, $K_2HPO_4$ | g | 0.1 |
| Tap water | cc | 1000 |

Sterilization (120° C. for 20 minutes).

Incubation followed at 28° C. for 48 hours on a rotary shaker with a range of 6 cm. at 220 r.p.m. 1 cc. of the culture broth obtained was employed to inoculate 300-cc. flasks containing 70 cc. of the following productive medium:

| | | |
|---|---|---|
| Starch | g | 40 |
| Casein | g | 15 |
| Magnesium sulphate, $MgSO_4 \cdot 7H_2O$ | g | 0.5 |
| Potassium hydrogen phosphate, $K_2HPO_4$ | g | 0.2 |
| Ferrous sulphate, $FeSO_4 \cdot 7H_2O$ | g | 0.010 |
| Zinc sulphate, $ZnSO_4 \cdot 7H_2O$ | g | 0.010 |
| Copper sulphate, $CuSO_4 \cdot 5H_2O$ | g | 0.001 |
| Tap water | cc | 1000 |

Sterilization (120° C. for 20 minutes).

After 6 days of incubation at 28° C. on a rotary shaker as described above, the culture broth contained a quantity of aminosydin corresponding to 1200 γ/cc. and a quantity of carotenoids corresponding to 60 γ/cc. From the culture broth, obtained after removing the mycelium through filtration, aminosydin was separated by adsorption on ion exchange resins and further elution with a mineral acid. The carotenoids were isolated from the mycelium containing them, first by extracting the mycelium with acetone, then by grinding in a ball mill with glass powder and sodium sulphate, and finally by repeated extraction with chloroform. The collected extracts containing carotenoids were evaporated in vacuo and then saponified with 12% by weight of alcoholic potassium hydroxide at room temperature for 20 minutes under nitrogen atmosphere. After diluting with water, the carotenoids were again extracted with chloroform. The chloroform extract was washed with water, dried over anhydrous sodium sulphate and evaporated in vacuo. The residue obtained was taken up with chloroform, and 5 cc. of the chloroform solution, containing 274 γ/cc. of carotenoids (considering $$E_{1\ cm}^{1\%} \text{ at } 460\ m\mu = 1,900)$$

are placed in a column of 1:1 magnesium oxide:magnesium silicate (Celite) and then eluted several times with chloroform containing from 1 to 10% of ethanol.

The absorption bands obtained corresponded to from 10 to 60% of carotenes and from 40 to 90% of xanthophylls.

Similar results were obtained by separating the carotenes from the xanthophylls as described by Hope et al., Handbuch Physiol. Pathol. Chem. Analyse, 1955, III/2, p. 1054.

*Example 2*

A vegetative culture obtained as described in Example 1 was employed to inoculate 300-cc. flasks, containing 30 cc. of the following culture medium:

| | G. |
|---|---|
| Glucose | 80 |
| Dry yeast | 30 |
| Magnesium sulphate, $MgSO_4$ | 0.5 |
| Potassium hydrogen phosphate, $K_2HPO_4$ | 0.2 |
| Ferrous sulphate, $FeSO_4 \cdot 7H_2O$ | 0.010 |
| Zinc sulphate, $ZnSO_4 \cdot 7H_2O$ | 0.010 |
| Copper sulphate, $CuSO_4 \cdot 5H_2O$ | 0.001 | pH (not adjusted).
Sterilization (120° C. for 20 minutes).

After 5 days of incubation under the conditions described in Example 1, a production corresponding to more than 500 γ/cc. for carotenoids and 120 γ/cc. for aminosydin was obtained.

*Example 3*

Fermentation was carried out as in Example 2, with the difference that dextrin replaced glucose in the culture medium. After 144 hours of fermentation, 240 γ/cc. of carotenoids and 250 γ/cc. of aminosydin were obtained.

*Example 4*

Fermentation was carried out as in Example 2, with the difference that 2% of a mixture 1:1 of cottonseed and soyabean oils replaced glucose in the productive medium. After 6 days of fermentation, 200 γ/cc. of carotenoids and 950 γ/cc. of aminosydin were obtained.

*Example 5*

Fermentation was carried out as in Example 2, with the difference that the productive medium had the following composition:

| | | |
|---|---|---|
| Distiller's solubles | g | 50 |
| Starch | g | 10 |
| Glucose | g | 40 |
| Yeast extract | g | 1 |
| Tap water | g | 1000 |
| pH | | 6.2–6.5 |

After 6 days of fermentation, 280 γ/cc. of carotenoids and 400 γ/cc. of aminosydin were obtained.

*Example 6*

The culture broth obtained by carrying out the fermentation as in Example 1, was centrifuged at 5000 r.p.m. for 40 minutes. The supernatant liquid, which contains nearly all the aminosydin produced, was used for extraction and the mycelium was suspended in a quantiy corresponding to the original volume of a solution of the following composition:

| | G. |
|---|---|
| Glucose | 60 |
| Dry yeast | 10 |
| Potassium hydrogen phosphate, $K_2HPO_4$ | 0.2 |
| Magnesium sulphate, $MgSO_4$ | 0.5 |
| Ferrous sulphate, $FeSO_4 \cdot 7H_2O$ | 0.010 |
| Zinc sulphate, $ZnSO_4 \cdot 7H_2O$ | 0.010 |
| Copper sulphate, $CuSO_4 \cdot 5H_2O$ | 0.001 |

This suspension was distributed at the rate of 30 cc. per 300-cc. flask and incubated under the conditions described above. After 4 days, a quantity of carotenoids corresponding to 200 γ/cc. was obtained.

*Example 7*

In a 10-liter fermenter, 6 liters of the following culture medium was sterilized by heating at 120° C. for 40 minutes:

| | | |
|---|---|---|
| Distiller's solubles | g | 50.6 |
| Dry yeast | g | 5 |
| Dextrin | g | 80 |
| Magnesium sulphate, $MgSO_4$ | g | 0.5 |
| Potassium hydrogen phosphate, $K_2HPO_4$ | g | 0.2 |
| Ferrous sulphate, $FeSO_4 \cdot 7H_2O$ | mg | 10 |
| Zinc sulphate, $ZnSO_4 \cdot 7H_2O$ | mg | 10 |
| Copper sulphate $CuSO_4 \cdot 5H_2O$ | mg | 1 |
| Tap water | cc | 1000 |
| pH | | 6.5 |

600 cc. of a vegetative culture prepared as in Example 1 were used to inoculate the above medium. The culture was incubated at 28° C. with an air stream of 5 liters per minute and with stirring at 350 r.p.m. After 6 days, a yield of 280 γ/cc. of carotenoids and 100 γ/cc. of aminosydin was obtained.

*Example 8*

Chicken feed having the following composition was prepared (the values are percent by weight):

| | |
|---|---|
| Fish meal | 6.00 |
| Soya extract | 25.75 |
| Beer yeast | 1.00 |
| Dehydrated lucerne | 1.00 |
| Maize (corn) | 60.20 |
| Tricalcium phosphate | 1.40 |
| Calcium carbonate | 0.80 |
| Sodium chloride | 0.30 |
| Stabilized fat | 1.55 |
| Mixture of vitamins and oligoelements | 2.00 |
| | 100.00 |

The mixture of vitamins and oligoelements had the following composition (the weights are per 2 kg. of mixture):

| | | |
|---|---|---|
| Vitamin $D_3$ | I.U. | 100,000 |
| Vitamin PP | g. | 1.5 |
| Vitamin $B_{12}$ | mg. | 1 |
| Riboflavin | mg. | 300 |
| Calcium pantothenate | g. | 1.5 |
| Choline chloride | g. | 75 |
| DL-Methionine | g. | 20 |
| Chlorotetracycline | g. | 1 |
| Penicillin G-procaine | g. | 5 |
| Cobalt | mg. | 25 |
| Iron | g. | 1.5 |
| Iodine | mg. | 50 |
| Manganese | g. | 7.5 |
| Zinc | g. | 4 |
| Copper | mg. | 125 |
| Vehicle (to make up). | | |

To 100 kg. of feed having the above composition, 150 g. of dry powdered mycelium were added.

The above feed containing carotenoids when administered to chickens, after 60 days promoted an increase of weight equal to that obtained with a feed having the above composition but containing 1,000,000 I.U. of vitamin A instead of the mycelium. Furthermore, the chickens fed with feed containing carotenoids, show a cutaneous and egg pigmentation remarkably deeper than that obtained with the normal feed containing vitamin A.

*Example 9*

Feed for swine having the following composition was prepared (the values are percent by weight):

| | |
|---|---|
| Fish meal | 4.0 |
| Soya extract | 16.0 |
| Maize | 61.3 |
| Wheat bran | 12.0 |
| Lucerne meal | 3.0 |
| Tricalcium phosphate | 1.5 |
| Calcium carbonate | 0.7 |
| Sodium chloride | 0.5 |
| Mixture of vitamins and oligoelements | 1.0 |
| | 100.0 |

The mixture of vitamins and oligoelements had the following composition (the weights are per 1 kg. of the mixture):

| | | |
|---|---|---|
| Vitamin $D_3$ | I.U. | 200,000 |
| Vitamin $B_{12}$ | mg. | 2 |
| Vitamin PP | g. | 2 |
| Riboflavin | mg. | 300 |
| Calcium pantothenate | g. | 1 |
| Choline chloride | g. | 50 |
| DL-methionine | g. | 25 |
| Chlorotetracycline | g. | 1.5 |
| Penicillin G-procaine | mg. | 500 |
| Zinc | g. | 2.5 |
| Iron | g. | 2.8 |
| Copper | mg. | 500 |
| Cobalt | mg. | 25 |
| Iodine | mg. | 50 |
| Manganese | g. | 2 |
| Vehicle (to make up). | | |

To 100 kg. of feed having the above composition, 250 g. of dry mycelium of *Streptomyces chrestomyceticus* var. *aurantioideus* were added.

The above feed containing carotenoids when administered to swine of 20 kg. body weight promoted, after 60 days, an increase of weight corresponding to that obtained by administering a feed having the above composition but containing 1,000,000 I.U. of vitamin A instead of the mycelium.

*Streptomyces chrestomyceticus* is spelled *Streptomyces krestomyceticus* in Arcamone et al. Patent 3,065,147 and it has been deposited at the Institute of Microbiology of the Rutgers University, under the No. 3835; at the Commonwealth Mycological Institute under the number 79589 and at the National Collection of Industrial Bacteria under the number N.C.I.B. 8995.

We claim:
1. A process for the preparation of carotenoids and aminosydin, which comprises fermenting *Streptomyces chrestomyceticus* var. *aurantioideus* in submerged culture and under aerobic conditions in an aqueous nutritive medium containing a source of carbon, nitrogen and mineral salts, and separating the mycelium, containing carotenoids, from the fermentation broth, containing aminosydin, by filtration and centrifuging.
2. The process of claim 1, in which the fermentation is carried out at a temperature of from 24° to 32° C. for a period from 1 to 8 days and at a pH from 5 to 8.
3. The process of claim 2, in which the fermentation is carried out in the presence of a carbon source selected from the group consitsing of glucose, dextrin, lactose and mannitol.
4. The process according to claim 2, in which the fermentation is carried out in the presence of starch as a carbon source.
5. The process according to claim 2, in which the fermentation is carried out in the presence of soyabean oil as a carbon source.
6. The process according to claim 2, in which the fermentation is carried out in the presence of cottonseed oil as a carbon source.
7. The process according to claim 2, in which the fermentation is carried out in two stages, firstly in an aqueous nutritive medium in the presence of starch as a carbon source and under slight aeration, and secondly, after the mycelium has been separated from the first stage, it is then fermented in an aqueous nutritive medium in the presence of a carbon source selected from the group consisting of glucose, dextrin, lactose and mannitol and under strong aeration.
8. The process of claim 2, wherein the fermentation is carried out under conditions of strong aeration to obtain high yields of carotenoids and low yields of aminosydin.
9. The process of claim 2, wherein the fermentation is carried out under conditions of slight aeration to obtain high yields of aminosydin and low yields of carotenoids.

References Cited

UNITED STATES PATENTS

| | | | |
|---|---|---|---|
| 2,959,521 | 11/1960 | Zajic | 195—28 |
| 2,974,044 | 3/1961 | Moore et al. | |
| 3,065,147 | 11/1962 | Arcamone et al. | 195—80 |
| 3,085,049 | 4/1963 | Rudy et al. | 99—2 X |

A. LOUIS MONACELL, *Primary Examiner.*

ALVIN E. TANENHOLTZ, *Examiner.*